(12) United States Patent
Lu

(10) Patent No.: US 9,047,500 B2
(45) Date of Patent: Jun. 2, 2015

(54) INTEGRATED THIN FILM IMAGER FOR BRIGHT FIELD, DARK FIELD, AND FRUSTRATED TOTAL INTERNAL REFLECTION IMAGING

(75) Inventor: Jeng Ping Lu, Fremont, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 495 days.

(21) Appl. No.: 13/584,528

(22) Filed: Aug. 13, 2012

(65) Prior Publication Data

US 2014/0043527 A1  Feb. 13, 2014

(51) Int. Cl.
*G03B 7/00* (2014.01)
*G06K 9/00* (2006.01)
*G03B 15/03* (2006.01)

(52) U.S. Cl.
CPC ............ *G06K 9/00046* (2013.01); *G03B 15/03* (2013.01)

(58) Field of Classification Search
CPC ....... G06K 9/00046; G03B 15/03; G03B 7/00
USPC ................. 250/208.1; 348/362; 257/290–292
See application file for complete search history.

(56) References Cited

U.S. PATENT DOCUMENTS

| | | | |
|---|---|---|---|
| 5,920,401 A | 7/1999 | Street et al. | |
| 2002/0140886 A1* | 10/2002 | Sugiura et al. | 349/113 |
| 2005/0134768 A1* | 6/2005 | Sugiura et al. | 349/113 |
| 2010/0038647 A1* | 2/2010 | Cho et al. | 257/72 |
| 2011/0043473 A1* | 2/2011 | Kozuma | 345/173 |
| 2011/0096047 A1* | 4/2011 | Endo | 345/207 |
| 2011/0101481 A1* | 5/2011 | Nozaki | 257/432 |
| 2011/0297936 A1* | 12/2011 | Makita et al. | 257/53 |
| 2012/0181552 A1* | 7/2012 | Nozaki | 257/84 |
| 2012/0242636 A1* | 9/2012 | Yuki et al. | 345/207 |

* cited by examiner

*Primary Examiner* — Seung C Sohn
(74) *Attorney, Agent, or Firm* — Marger Johnson & McCollom PC

(57) ABSTRACT

An optical imaging system includes a thin film imager that is able to create images of objects in various modes of imaging such as bright field, dark field, frustrated total internal reflection, fly eye, and the like. The imaging system may be an integrated optical design that performs different modes of optical imaging in the same imaging device by positioned pin hole structures in geometries that capture images according to the desired mode of imaging.

20 Claims, 4 Drawing Sheets

INTEGRATED THIN FILM IMAGER FOR BRIGHT FIELD, DARK FIELD, AND FRUSTRATED TOTAL INTERNAL REFLECTION IMAGING

BACKGROUND

Imaging devices are usually dedicated devices that offer single-type imaging capabilities, such as bright-field, dark-field, and frustrated total internal reflection imagers. Bright-field imagers are usually found in the consumer marketplace as the typical point-and-shoot camera or typical microscope. Dark-field imagers are useful in detecting surface roughness differences, which have specialized applications from consumer products to medical devices and military applications. Frustrated total internal reflection imagers are very sensitive to objects that are in direct contact with a smooth substrate, which makes them ideal imagers for applications like finger print readers.

For bright field, dark field, and frustrated total internal reflection imagers, a finite optical path is needed to create a quality image. Essentially, the entire imaging device needs a non-negligible thickness even if the sensor array can be made negligibly thin. Some applications have attempted to develop contact imaging systems that are based on large area thin film technology that does not use optical components and thus reduces or eliminates the need for a finite optical path. However, even these systems are limited to bright-field imaging and the resolution is directly proportional to how close a user can position an object to be imaged to the surface of the contact imaging system.

Accordingly, there remains a need for an improved optical system that is able to perform different modes of imaging, such as integrating bright-field, dark-field, and frustrated total internal reflection imaging, in an optical system by easily changing a design choice that does not require a finite optical path to produce quality images in any of the modes.

SUMMARY

This disclosure relates to an integrated imager with design parameters that are easily changed to bright-field, dark-field, and frustrated total internal reflection imaging, when needed or desired. More specifically, it relates to an integrated imager in which one or more modes of imaging may be included in a single optical system with the option to add other modes of imaging if desired, by changing a simple design parameter(s) of the imaging system. The imager may be a thin film imager in some examples.

An imaging system includes a thin film imager that has a parameter that is changeable to allow the imager to be operable in a bright field, a dark field, or a frustrated total internal reflection imaging mode. The thin film imager in this example includes a light source that emits light toward an object to be imaged, a thin film light-blocking layer that has at least one hole such that at least a portion of the light reflected off of the object is received through the hole, and a photo sensor that is positioned to sense the reflected light that travels through the hole of the thin film light-blocking layer.

A method of imaging includes emitting light from a light source toward an object to be imaged, receiving at least a portion of the emitted light through a hole in a thin film light-blocking layer that includes light reflected off of the object to be imaged, and detecting the reflected light that travels through the hole of the thin film light-blocking layer.

An example integrated imaging system includes a light source that emits light toward an object to be imaged, a light-blocking layer that has at least one hole such that at least a portion of the light that is reflected off of the object to be imaged is received through the hole, and a photo sensor that is positioned to detect the reflected light that travels through the hole of the thin film light-blocking layer. In an example, the light source, the light-blocking layer, and the photo sensor are structured for bright-field imaging of the object. Other embodiments of the light source, light-blocking layer, and photo sensor are structured for additional modes of imaging, such as dark field, frustrated total internal reflection, fly eye, and the like.

DETAILED DESCRIPTION

Figure 1:
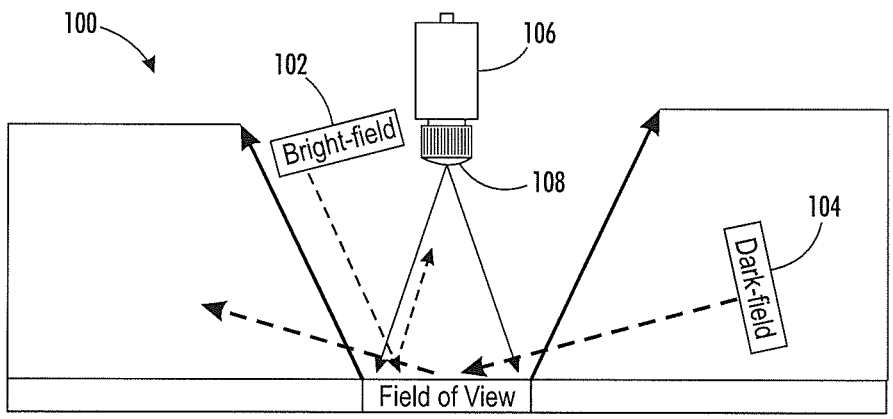
FIG. 1 is a prior art optical system that shows both bright-field and dark-field imaging modes having a finite optical pathway.

FIG. 1 shows a conventional, prior art optical system 100 that illustrates both bright field 102 and dark field 104 imaging modes. The bright field 102 imaging collects both reflected and diffused light and is sensitive to both surface morphology and surface color. The dark field 104 imaging purposely neglects directly reflected light and is primarily sensitive to surface morphology of the object to be imaged. As shown in FIG. 1, a charge-coupled device (CCD) 106 that includes a lens 108 defines an optical path for sensing in both a bright field 102 and dark field 104 imaging mode to define a field of view and a finite optical path of non-negligible thickness. A sensor array (not shown) in the CCD 106 detects the light that is reflected off of and diffused in the bright 102 and dark 104 field imaging modes. However, this conventional system requires the finite optical path in order to adequately sense the reflected and diffused light to produce a quality image.

Figure 2:
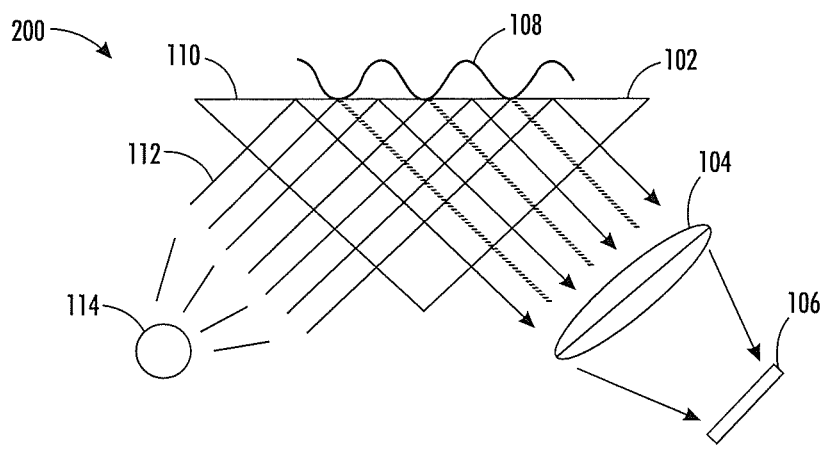
FIG. 2 is a prior art imaging system that shows a frustrated total internal reflection imaging mode also having a finite optical pathway.

FIG. 2 shows a conventional system for collecting images through frustrated total internal reflection, which includes a prism 102, a lens 104, and a CCD 106. An object to be imaged 108 is positioned on a surface 110 of the prism 102 and light 112 is emitted toward the prism 102 such that the light 112 travels through the prism 102 and toward the object to be imaged 108. Some portion of the light 112 is reflected off of the object to be imaged 108 and redirected back through the prism 102 in a different direction from the light source 114 and toward the lens 104. Some of the light 112 is directed to travel through the lens 104 and is sensed by the CCD 106.

FIGS. 3-7 show integrated pin hole structures for various modes of imaging according to embodiments of the disclosure. The pin holes structures are positioned directly on imagers and are based on large area thin film electronics. The position of the pin hole structures can be adjusted based on the type of imaging that is desired to produce high quality bright field, dark field, frustrated total internal reflection, and fly eye mode images. One or more modes of imaging may be included in a single optical system.

Figure 3:
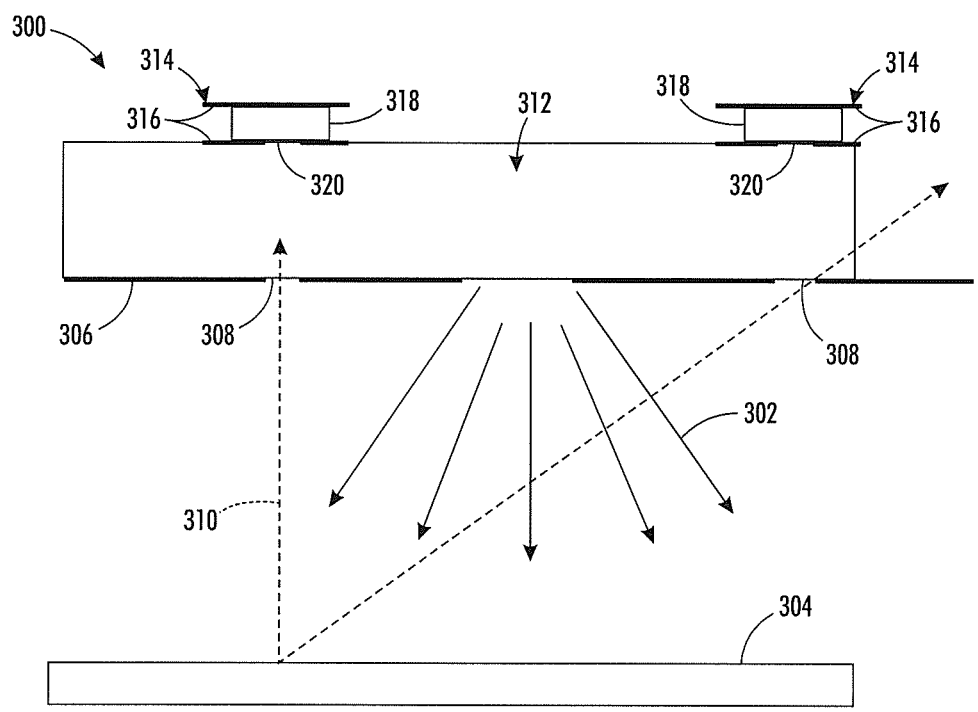
FIG. 3 is a bright-field imaging structure for an integrated imaging system, according to aspects of the disclosure.

FIG. 3 shows a geometry for a bright field imaging pin hole structure 300. This bright field imaging geometry 300 is not dependent on the gap between the object to be imaged and the imaging sensors or any finite optical path. In FIG. 3, a light 302 is emitted toward an object to be imaged 304. Some portion of the light 302 is reflected off of the object to be imaged 304 back toward the bright field imaging geometry 300 that includes a thin film light blocking layer 306 that includes at least one hole, although any number of holes may be included. In the example shown in FIG. 3, the thin film light-blocking layer 306 includes two holes 308 through which reflected light 310 is directed. The thin film light-blocking layer 306 is attached to one surface of a substrate 312.

On the opposite surface of the substrate 312, one or more optical sensors 314 are positioned. The optical sensors 314 may include one or more thin film metal layers 316 and a thin film photo sensor 318. The thin film metal layers 316 may extend over two opposing surfaces of the thin film photo sensor 318. The surface of the thin film metal layer 316 that is positioned on the surface of the thin film photo sensor 318 positioned on the substrate 312 may include one or more pin holes 320. The pin holes 320 of this surface of the thin film metal layers 316 may be aligned with the pin holes 308 of the thin film light-blocking layer 306, as shown in FIG. 3. In FIG. 3, the thin film light-blocking layer 306 includes two pin hole structures 308 that are aligned with two corresponding pin hole structures 320 of the thin film metal layers 316 that are on the surface of two corresponding thin film photo sensors 316 that are positioned on the opposite surface of the substrate 312 from the thin film light-blocking layer 306.

Figure 4:
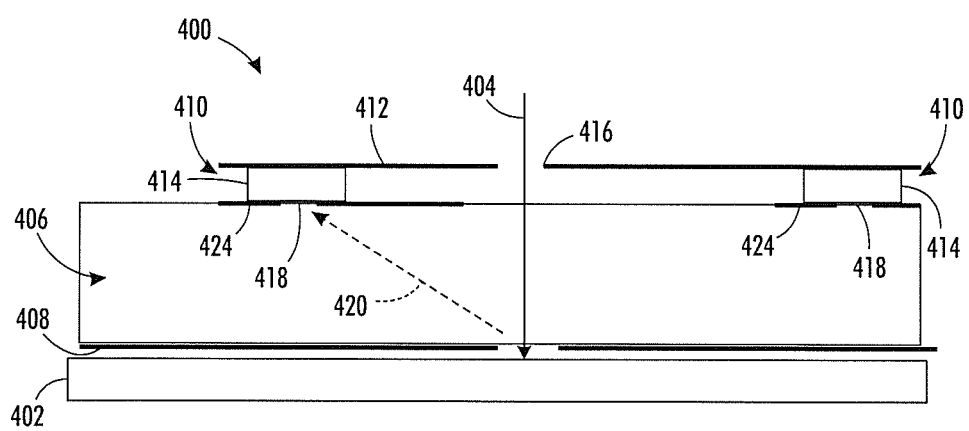
FIG. 4 is dark-field imaging structure for an integrated imaging system, according to aspects of the disclosure.

FIG. 4 shows a geometry for a dark field imaging pin hole structure 400. Other examples may include additional pin hole structures. The elements of the dark field imaging pin hole structure 400 are similar to the elements shown in FIG. 3 for the bright field imaging pin hole structure 300 and include an object to be imaged 402, a light source 404, a substrate 406, a thin film light-blocking layer 408, and two optical sensors 410, although any number of optical sensors may be included. In the dark field imaging geometry 400, the light source 404 is positioned on the opposite side of the dark field imaging geometry 400 from the object to be imaged 402. A thin film metal layer 412 extends between a surface of two thin film photo sensors 414 and has a pin hole 416 through which the light source 404 emits light toward the object to be imaged 402. In this example, the opposite surface of the two thin film photo sensors 414 also includes respective thin film metal layers 418. These thin film metal layers 418 are also positioned on a surface of the substrate 406 and permit light 420 reflected off of the object to be imaged 402 to be received by and sensed by the thin film photo sensors 414. These thin film metal layers 418 are discrete from each other and do not extend between the two thin film photo sensors 414 in this example.

Once the light has been emitted through the hole 416 in the thin film metal layer 412, the light travels through the substrate 406 and toward the thin film light-blocking layer 408 that is attached to the opposite side of the substrate 406 from the light source 404. The thin film light-blocking layer 408 includes at least one pin hole structure 422 through which the light is emitted. On the opposite side of the thin film light-blocking layer 408 is the object to be imaged 402. The light contacts the object to be imaged 402 through the pin hole structure 422 of the thin film light-blocking layer 408 and a portion of the light is reflected 420 off of the object to be imaged 402 and back through the pin hole structure 422 of the thin film light-blocking layer 408.

Some portion of the reflected light 420 travels through the substrate 406 again back toward the thin film photo sensors 414. The surface of thin film metal layers 424 that are positioned on the substrate 406 both include a pin hole 418 through which the reflected light 420 is received and then sensed by the respective thin film photo sensors 414. The pin hole structure 422 of the thin film light-blocking layer 408 is offset from the pin hole structures 418 of the thin film metal layers 424 that are attached to the thin film photo sensors 414. This offset structure allows for dark field imaging to occur. The pin hole structure 422 of the thin film light-blocking layer 408 may be offset from the pin hole structure 418 of the thin film metal layers 424 at any suitable angle. In the example shown in FIG. 4, the angle at which the reflected light 424 is sensed is approximately 45° with respect to the point at which the light is reflected off of the object to be imaged 402.

Figure 5:
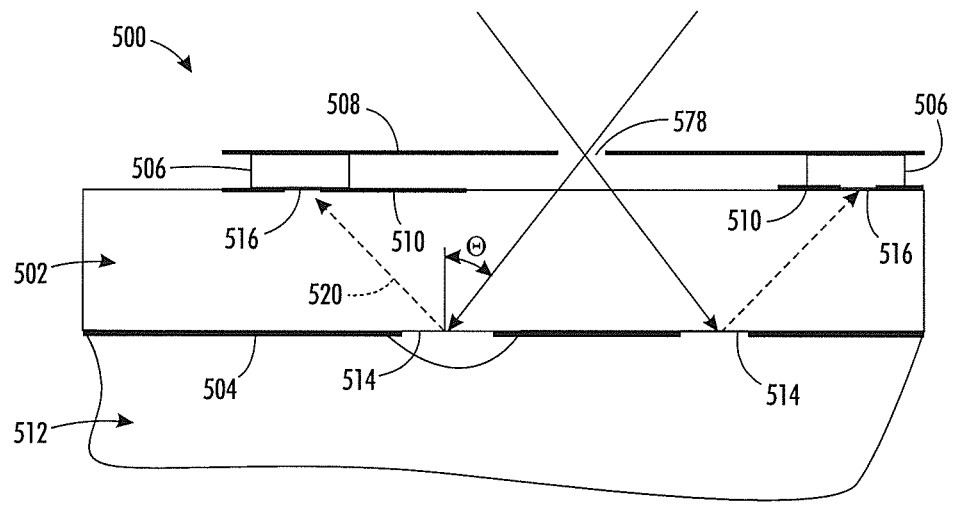
FIG. 5 is a frustrated total internal reflection structure for an integrated imaging system, in accordance with aspects of the disclosure.
Figure 6:
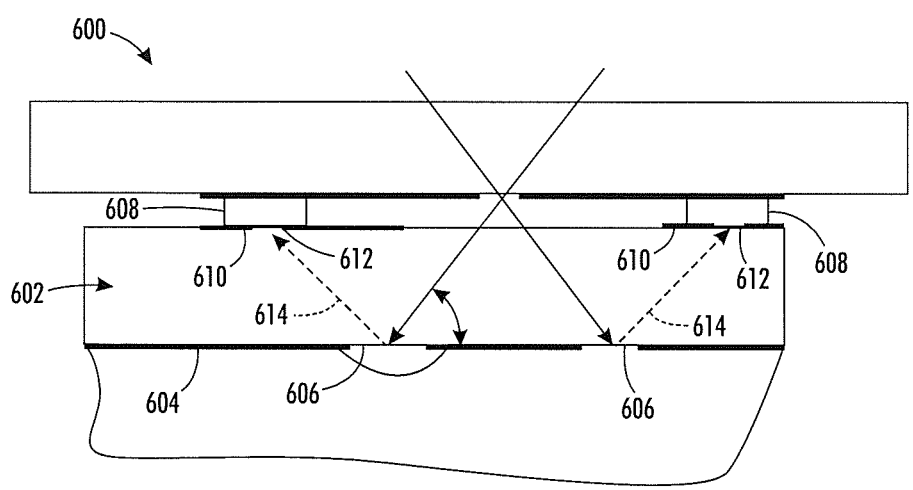
FIG. 6 is a reversed frustrated total internal reflection structure using a transparent film for an integrated imaging system, in accordance with aspects of the disclosure.

FIGS. 5 and 6 show alternate embodiments of a geometry for frustrated total internal reflection imaging pin hole structures 500, 600. Other examples may include additional pin hole structures. The geometry shown in FIG. 5 includes a substrate 502 with a thin film light-blocking layer 504 attached to one surface and thin film photo sensors 506 having thin film metal layers 508, 510 positioned on opposing surfaces. The object to be imaged 512 is positioned near or in physical contact with the thin film light-blocking layer 504. The thin film light-blocking layer 504 includes at least one pin hole structure 514 through which light is emitted to contact the object to be imaged 512 and through which light reflected off of the object to be imaged 512 is received through so it can be sensed by the thin film photo sensors 506. The light source in this frustrated total internal reflection geometry 500 is located on the opposite side of the substrate 502 from the object to be imaged 512.

The light source emits light through a pin hole 518 in the thin film metal layer 508 that extends between the two thin film photo sensors 506 and through the substrate 502 shown in FIG. 5. The light travels through the substrate 502 and contacts the object to be imaged 512 through the pin hole structures 514 in the thin film light-blocking layer 504. Some portion of the light is reflected off of the object to the imaged 512 and back through the pin hole structures 514 in the thin film light-blocking layer 504. The reflected light 520 travels back through the substrate 502 and some portion of the reflected light 520 is received through the pin holes 516 in two thin film metal layers 510 and is sensed by the thin film photo sensors 506.

In the example shown in FIG. 5, the thin film light-blocking layer includes two pin hole structures 514 and has two photo sensors 506 that each have a thin film metal layer 510 that have corresponding pin hole structures 516 for receiving the reflected light 520 so the thin film photo sensors 506 can sense the received reflected light 520. Each of the pin hole structures 514 of the thin film light-blocking layer 504 are offset from the pin hole structures 516 of the thin film metal layers 510, which controls the angle at which the thin film photo sensors 506 sense the reflected light 520. The refraction indices of the substrate 502 and the object to be imaged 512 define a critical angle for reflection of light with respect to the normal of the substrate or object. If the refractive index is lower on the opposite side of the boundary from the light and the incident angle is greater than the critical angle, no light can pass through the boundary and all of the light is reflected.

The critical angle is the angle of incidence above which total internal reflection of the light occurs.

The relative positions of pin hole structures 514 and pin hole 578 are designed such that the incident angle (shown as θ in FIG. 5) is larger than the critical angle defined by the refraction indices of the substrate 502 and the object to be imaged 512. For example, the critical angle is 45° and the relative positions of the pin hole structures 514 and pin hole 578 are positioned so that the light travels through pin hole 578 and through pin hole structures 514 to be reflected off of the object to be imaged 512 back toward the thin film metal layer 510 so it can be received through pin hole structures 516 and sensed by the photo sensors 506.

FIGS. 3-5 show bottom illumination geometry, which causes the light source to emit light from the opposite side of the substrate from the object to be imaged. This geometry requires some portion of the substrate to be transparent or at least partially transparent. The same pin hole geometry principles may apply to non-transparent substrates and are known as front-side imaging devices. FIG. 6 shows an example of a front-side imaging device employing a frustrated total internal reflection imaging geometry 600. In this example, the light is emitted to travel through a laminated transparent film layer 602 toward a thin film light-blocking layer 604 that has two pin hole structures 606. Similar in nature to the structure shown in FIG. 5, the thin film light-blocking layer 604 includes two pin hole structures 606 and two thin film photo sensors 608 that each have a thin film metal layer 610 that each have corresponding pin hole structures 612 for receiving the reflected light 614 so the thin film photo sensors 608 can sense the received reflected light 614. Each of the pin hole structures 606 of the thin film light-blocking layer 604 are offset from the pin hole structures 612 of the thin film metal layers 610 and control the angle at which the thin film photo sensors 608 sense the reflected light 614.

Figure 7:
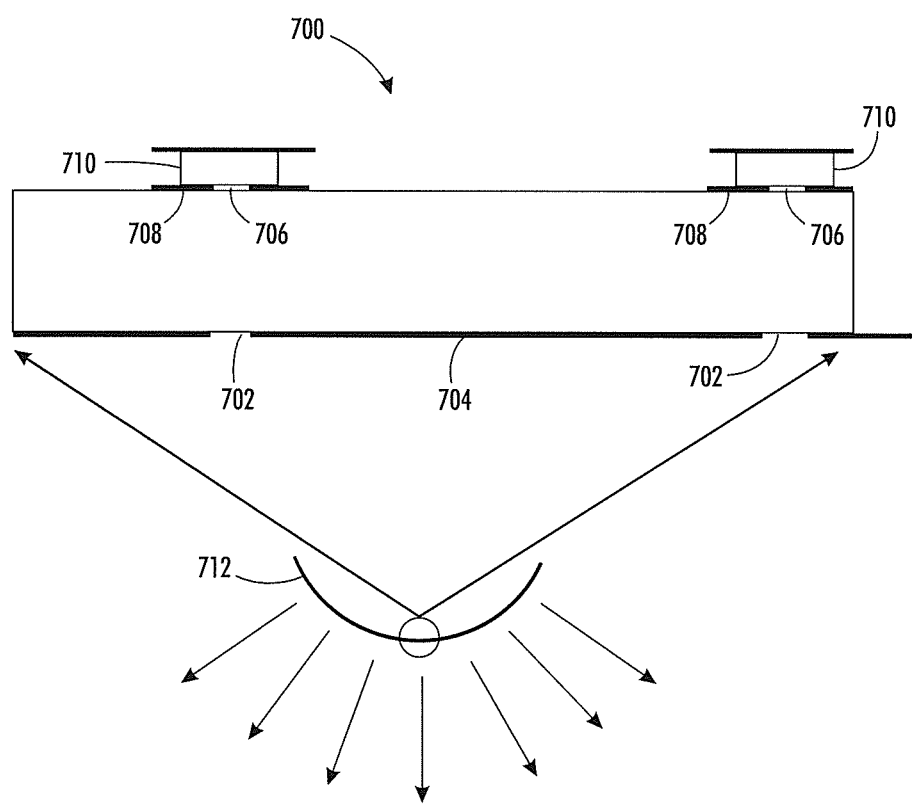
FIG. 7 is a fly eye structure for an integrated imaging system, according to aspects of the disclosure.

FIG. 8 shows a geometry for a simple fly eye imaging pin hole structure 700. The structure of the simple fly eye imaging pin hole structure 700 is similar to the bright field imaging pin hole geometry described above with respect to FIG. 3. For example, the pin holes 702 of the thin film light-blocking layer 704 shown in FIG. 7 are aligned with the pin holes 706 of the thin metal layers 708 attached to the thin film photo sensors 710, in a similar manner to the pin hole structures of the thin film light-blocking layer and the thin film metal layers of the bright field imaging geometry shown in FIG. 3. FIG. 7 also includes a fly eye structure 712 that is dome-shaped or otherwise rounded. The fly eye structure 712 controls the angle of the light that is emitted toward the object to be imaged and the angle at which the light reflected off of the object to be imaged is sensed by the thin film photo sensors 710.

The substrates described above may include any suitable substrates, including flexible substrates. The thin film photo sensors described above may include the thin film metal layers for top and bottom biasing contacts, which also are described above, although the thin film photo sensors do not include thin film metal layers in some examples. The thin film photo sensors may include an amorphous silicon PIN sensor. The thin film light-blocking layers described above may include any non-transparent, thin film material(s) with light absorbing capabilities. Examples of such thin film light-blocking layers include silicon, metal, SiOxNy, amorphous carbon, polyimide, thin film multi-layers, and any polymer that is loaded with carbon black or includes a printed black pattern.

It will be appreciated that variations of the above-disclosed thin film imager and methods and other features and functions, or alternatives thereof, may be desirably combined into many other different systems, methods, or applications. For example, monitoring curing processes may use any one or more of the above monitoring devices. Also various presently unforeseen or unanticipated alternatives, modifications, variations, or improvements therein may be subsequently made by those skilled in the art which also are intended to be encompassed by the following claims.

The invention claimed is:

1. An integrated imaging system, comprising:
 a light source that emits light toward an object to be imaged;
 a thin film light-blocking layer having at least one hole such that at least a portion of the light reflected off of the object to the imaged is received through the hole of the thin film light blocking layer; and
 a photo sensor positioned to detect the reflected light that travels through the hole of the thin film light-blocking layer.

2. The integrated imaging system of claim 1, wherein the thin film light-blocking layer is a thin film metal layer.

3. The integrated imaging system of claim 2, wherein the photo sensor includes a top biasing contact and a bottom biasing contact, and wherein the top biasing contact, the bottom biasing contact, and the thin film light-blocking layer each include at least one common material.

4. The integrated imaging system of claim 1, wherein the thin film light-blocking layer includes at least one of silicon, metal, SiOxNy, amorphous carbon, and polyimide.

5. The integrated imaging system of claim 1, further including a substrate secured to the thin film light-blocking layer.

6. The integrated imaging system of claim 5, wherein the substrate is flexible.

7. The integrated imaging system of claim 5, wherein the substrate is positioned between the thin film light-blocking layer and the photo sensor.

8. The integrated imaging system of claim 5, wherein the thin film light-blocking layer is spaced apart from the object to be imaged, and wherein the light source is positioned on the same side of the thin film light-blocking layer as the object to be imaged such that light emitted toward the object to be imaged is reflected off of the object to the imaged through the hole.

9. The integrated imaging system of claim 5, wherein the thin film light-blocking layer is positioned adjacent to the object to be imaged, and wherein the light source is positioned on the opposite side of the photo sensor from the substrate and the thin film light-blocking layer, such that the light source emits light through a hole in a photo sensor layer that includes the photo sensor, through the substrate, and through the hole in the thin film light-blocking layer that is then reflected off of the object to be imaged and detected by the photo sensor.

10. The integrated imaging system of claim 9, wherein the hole of the photo sensor layer is aligned with the hole of the thin film light-blocking layer.

11. The integrated imaging system of claim 10, wherein the integrated imaging system is positioned so that the thin film light-blocking layer and the photo sensor are curved to form a fly eye imaging device.

12. The integrated imaging system of claim 9, wherein the hole of the photo sensor layer is offset from the hole of the thin film light-blocking layer.

13. The integrated imaging system of claim 12, wherein the thin film light-blocking layer blocks a direct light path from the light source so at least a portion of the light is received through the hole of the thin film light-blocking layer.

14. The integrated imaging system of claim 9, wherein an angle at which the light contacts the object to be imaged is greater than a critical angle of the boundary between the thin film light-blocking layer and the object.

15. A method of imaging, comprising:
  emitting light from a light source toward an object to be imaged;
  receiving at least a portion of the emitted light through a hole in a thin film light-blocking layer, wherein the at least a portion of the emitted light includes light reflected off of the object to be imaged; and
  detecting the reflected light that travels through the hole of the thin film light-blocking layer.

16. The method of claim 14, wherein the thin film light-blocking layer is spaced apart from the object to be imaged, and wherein the light source is positioned on the same side of the thin film light-blocking layer as the object to be imaged, such that light emitted toward the object to be imaged is reflected off of the object to the imaged through the hole in the thin film light-blocking layer.

17. The method of claim 14, further comprising a substrate secured to the thin film light-blocking layer, wherein the substrate is positioned between the thin film light-blocking layer and the photo sensor.

18. The thin film imager of claim 16, wherein the thin film light-blocking layer is positioned adjacent to the object to be imaged, and wherein the light source is positioned on the opposite side of the photo sensor from the substrate and the thin film light-blocking layer, such that a pathway of the light emitted from the light source extends through a hole in a photo sensor layer that includes the photo sensor, through the substrate, and through the hole in the thin film light-blocking layer that is then reflected off of the object to be imaged and detected by the photo sensor.

19. The thin film imager of claim 17, wherein the hole of the photo sensor layer is aligned with the hole of the thin film light-blocking layer.

20. An imaging system, comprising:
  a thin film imager, comprising:
    a light source that emits light toward an object to be imaged;
    a thin film light-blocking layer having at least one hole such that at least a portion of the light reflected off of the object to the imaged is permitted to travel through the hole of the thin film light block; and
    a photo sensor positioned to detect the reflected light that travels through the hole of the thin film light-blocking layer,
  wherein the thin film imager is operable in at least two of a bright field, a dark field, and a total internal reflection imaging of the object to be imaged.

* * * * *